US009373290B2

(12) United States Patent (10) Patent No.: US 9,373,290 B2
Lee (45) Date of Patent: Jun. 21, 2016

(54) DISPLAY MODULE WITH E-PAPER DISPLAY COMPONENT AND AUXILIARY DISPLAY COMPONENT

(71) Applicant: E Ink Holdings Inc., Hsinchu (TW)

(72) Inventor: Cheng-Hao Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/483,166

(22) Filed: Sep. 11, 2014

(65) Prior Publication Data

US 2015/0187282 A1 Jul. 2, 2015

(30) Foreign Application Priority Data

Dec. 27, 2013 (TW) .............................. 102148726 A

(51) Int. Cl.
*G09G 3/34* (2006.01)
*G09G 3/36* (2006.01)
*G09G 3/32* (2016.01)
*G02F 1/167* (2006.01)

(52) U.S. Cl.
CPC ................ *G09G 3/344* (2013.01); *G02F 1/167* (2013.01); *G09G 3/3208* (2013.01); *G09G 3/36* (2013.01); *G02F 2001/1672* (2013.01); *G02F 2001/1676* (2013.01); *G02F 2201/44* (2013.01); *G09G 2300/023* (2013.01)

(58) Field of Classification Search
CPC ..................................................... G09G 3/344
USPC ....................................................... 345/107
See application file for complete search history.

(56) References Cited

U.S. PATENT DOCUMENTS

| 2003/0176557 | A1* | 9/2003 | Liang | .................... G09J 153/00 524/474 |
| 2004/0169912 | A1* | 9/2004 | Liang | ..................... G02F 1/167 359/296 |
| 2004/0252076 | A1* | 12/2004 | Kodama | ............... G09G 3/3208 345/3.1 |
| 2006/0061530 | A1* | 3/2006 | Yuasa | ....................... G09G 3/36 345/88 |
| 2008/0007486 | A1* | 1/2008 | Fujinawa | .................. G09G 3/20 345/5 |
| 2008/0024430 | A1 | 1/2008 | Roh | |
| 2008/0100906 | A1* | 5/2008 | Iftime | ..................... G02F 1/167 359/296 |
| 2008/0211734 | A1* | 9/2008 | Huitema | ................. G02F 1/167 345/3.1 |

(Continued)

FOREIGN PATENT DOCUMENTS

JP 2007155780 A 6/2007
TW 200406637 A 5/2004

(Continued)

OTHER PUBLICATIONS

Corresponding Taiwainese Office Action that these art references were cited on Aug. 12, 2015.

*Primary Examiner* — Adam J Snyder
(74) *Attorney, Agent, or Firm* — CKC & Partners Co., Ltd.

(57) ABSTRACT

A display module is disclosed herein. The display module includes a substrate, an auxiliary display component, and an e-paper display component. The auxiliary display component is disposed on the substrate. The e-paper display component is disposed on the auxiliary display component. In a shutter mode, the e-paper display component is substantially transparent, such that an image displayed by the auxiliary display component can pass along the e-paper display component and can be presented on a viewing side of the display module.

8 Claims, 4 Drawing Sheets

(56) References Cited

U.S. PATENT DOCUMENTS

| | | | |
|---|---|---|---|
| 2010/0253671 A1* | 10/2010 | Perry | G06F 3/1423 345/3.1 |
| 2010/0309096 A1* | 12/2010 | Inoh | G09G 3/20 345/5 |
| 2011/0043435 A1* | 2/2011 | Hebenstreit | G09G 3/34 345/5 |
| 2011/0080417 A1* | 4/2011 | Lin | G09G 3/344 345/107 |
| 2012/0026106 A1 | 2/2012 | Chiu et al. | |
| 2012/0060089 A1 | 3/2012 | Heo et al. | |
| 2012/0069064 A1* | 3/2012 | Yamakita | G02F 1/167 345/690 |
| 2012/0081272 A1* | 4/2012 | Ogita | G09G 3/20 345/4 |
| 2012/0194448 A1 | 8/2012 | Rothkopf | |
| 2012/0287108 A1* | 11/2012 | Oh | G02F 1/133555 345/212 |
| 2013/0050164 A1 | 2/2013 | Rericha | |
| 2013/0071650 A1 | 3/2013 | Liu et al. | |

FOREIGN PATENT DOCUMENTS

| | | | |
|---|---|---|---|
| TW | 200706911 | 2/2007 | |
| TW | 200809328 | 2/2008 | |
| WO | WO 2006126526 A1 * | 11/2006 | G09G 3/3607 |
| WO | WO 2012155374 A1 * | 11/2012 | G09G 3/3611 |

* cited by examiner

DISPLAY MODULE WITH E-PAPER DISPLAY COMPONENT AND AUXILIARY DISPLAY COMPONENT

RELATED APPLICATIONS

This application claims priority to Taiwanese Application Serial Number 102148726, filed Dec. 27, 2013, which is herein incorporated by reference.

BACKGROUND

1. Field of Invention

The present invention relates to an electronic module. More particularly, the present invention relates to a display module.

2. Description of Related Art

Typically, an e-paper device includes white particles and dark particles positioned in a containing component. The white particles and the dark particles have different types of electric charges. When the white particles are gathered at a viewing side, the white particles can reflect light projecting on the e-paper device, so as to enable the e-paper device to display a white color. On the other hand, when the black particles are gathered at the viewing side, the black particles can absorb light projecting on the e-paper device, so as to enable the e-paper device to display a black color. Through such an operation, the e-paper device can display an image.

The e-paper device consumes little energy. However, the application for the e-paper is limited due to its low color saturation and low brightness.

Thus, an important area of research in this field involves ways in which to overcome such problems of low color saturation and low brightness, so as to enable greater application of the e-paper device.

SUMMARY

One aspect of the present disclosure is related to a display module. In accordance with one embodiment of the present disclosure, the display module includes a substrate, an auxiliary display component, and an e-paper display component. The auxiliary display component is disposed on the substrate. The e-paper display component is disposed on the auxiliary display component. In a shutter mode, the e-paper display component is substantially transparent, such that an image displayed by the auxiliary display component is able to pass along the e-paper display component and be presented on a viewing side of the display module.

In accordance with one embodiment of the present disclosure, in a normal mode, the e-paper display component is substantially opaque, and an image displayed by the e-paper display component is able to be presented on the viewing side of the display module.

In accordance with one embodiment of the present disclosure, the e-paper display component further includes a plurality of white particles, a plurality of dark particles, and at least two side electrodes. In a normal mode, the at least two side electrodes separately attract the white particles and the dark particles, so as to make the e-paper display component be substantially transparent.

In accordance with one embodiment of the present disclosure, the auxiliary display component is formed from a plurality of first pixels, the e-paper display component is formed from a plurality of second pixels, and a size of at least one pixel of the first pixels is substantially equal to a size of at least one pixel of the second pixels.

In accordance with one embodiment of the present disclosure, the first pixels and the second pixels are staggered with respect to each other.

In accordance with one embodiment of the present disclosure, the auxiliary display component is formed from a plurality of first pixels, the e-paper display component is formed from a plurality of second pixels, and a size of at least one pixel of the second pixels is smaller than a size of at least one pixel of the first pixels.

In accordance with one embodiment of the present disclosure, the auxiliary display component is an active matrix organic light emitting diode display or a liquid crystal display.

Another aspect of the present disclosure is related to a display module. In accordance with one embodiment of the present disclosure, the display module includes a substrate, an auxiliary display component, and an e-paper display component. The auxiliary display component is disposed on the substrate. The e-paper display component is disposed on the auxiliary display component. The e-paper display component includes an upper electrode, a lower electrode, an electronic ink layer, and at least two side electrodes. The electronic ink layer is disposed between the upper electrode and the lower electrode. The electronic ink layer includes a containing space, a plurality of white particles, a plurality of dark particles, and at least two side electrodes. The white particles and the dark particles are positioned inside the containing space. The at least two side electrodes separately disposed on at least two sides of the containing space. In a shutter mode, the at least two side electrodes separately attract the white particles and the dark particles, such that a user is able to see an image displayed by the auxiliary display component pass along the e-paper display component.

In accordance with one embodiment of the present disclosure, in a normal mode, the e-paper display component separately attracts the white particles and the dark particles through the upper electrode and the lower electrode, such that the user is able to see an image displayed by the e-paper display component.

In accordance with one embodiment of the present disclosure, a direction of a first electric field generated by the upper electrode and the lower electrode is substantially perpendicular to a direction of a second electric field generated by the at least two side electrodes.

Through an application of one embodiment described above, the user can determine to view the image displayed by the auxiliary display component or the image displayed by the e-paper display component according to actual requirements. Hence, the number of different types of applications for the e-paper device can be increased.

DETAILED DESCRIPTION

Figure 1:
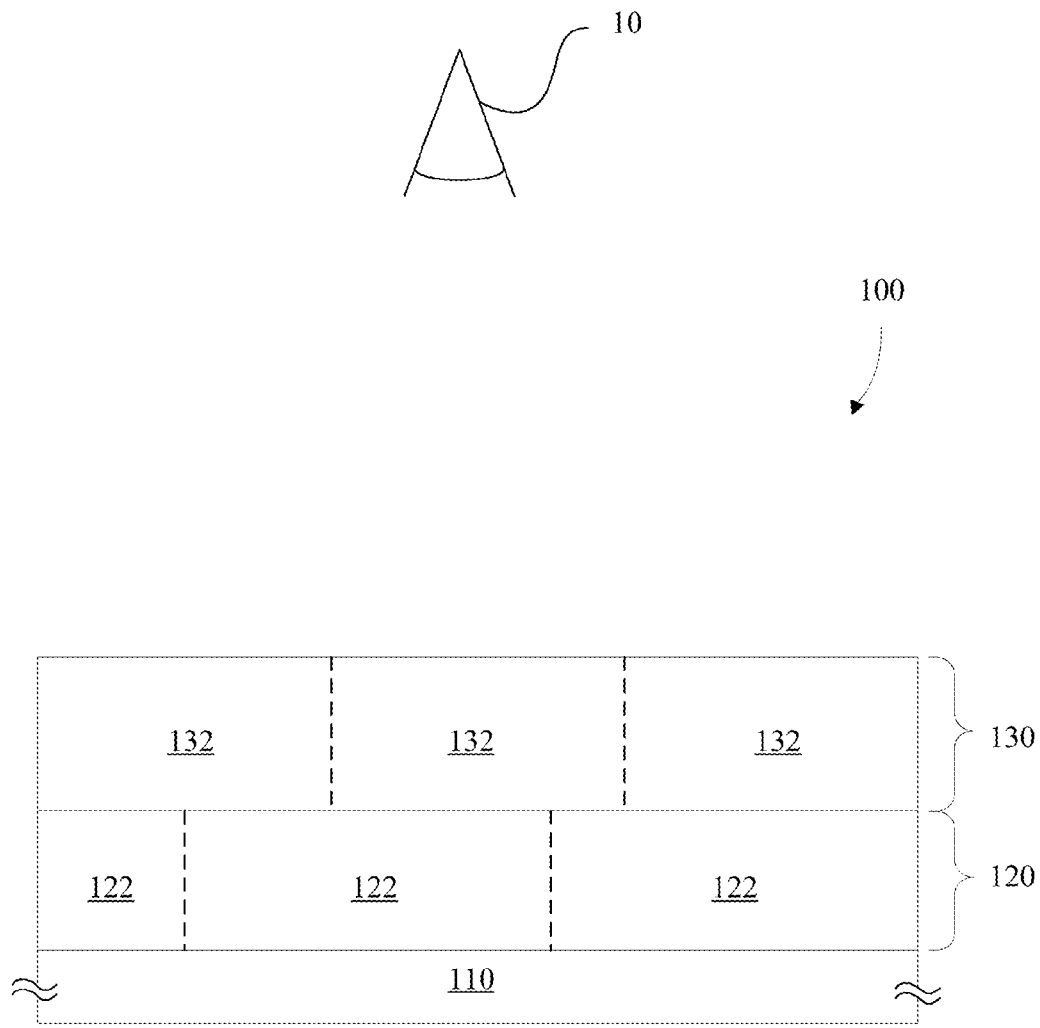
FIG. 1 is a schematic diagram of a display module according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the invention.

It will be understood that, in the description herein and throughout the claims that follow, when an element or layer is referred to as being "on," "connected to" or "coupled to" another element or layer, it can be directly on, connected or coupled to the other element or layer or intervening elements, or layers may be present. In contrast, when an element is referred to as being "directly on," "directly connected to" or "directly coupled to" another element or layer, there are no intervening elements or layers present. It is further noted that like numbers refer to like elements throughout.

It will be understood that, in the description herein and throughout the claims that follow, the phrase "and/or" includes any and all combinations of one or more of the associated listed items.

It will be understood that, in the description herein and throughout the claims that follow, although the terms first, second, etc. may be used to describe various elements, these elements should not be limited by these terms. These terms are only used to distinguish one element from another. For example, a first element could be termed a second element, and, similarly, a second element could be termed a first element, without departing from the scope of the embodiments.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a display module. FIG. 1 is a schematic diagram of a display module 100 according to one embodiment of the present invention.

In this embodiment, the display module 100 includes a substrate 110, an auxiliary display component 120, and an e-paper display component 130. The auxiliary display component 120 is disposed on the substrate 110. The e-paper display component 130 is disposed on the auxiliary display component 120.

In this embodiment, the substrate 110 can be a rigid substrate or a flexible substrate. The rigid substrate can be made by using, for example, glass, quartz, a silicon wafer, or another suitable material, but is not limited in this regard. The flexible substrate may be made by using, for example, plastic (i.e., acrylic material), metal foil, paper, or another suitable material, but is not limited in this regard. In this embodiment, the auxiliary display component 120 can be realized by, for example, a display component with an active light source, such as a liquid crystal display or an active matrix organic light emitting diode display, but is not limited in this regard. The e-paper display component 130 is, for example, an electrophoretic display component, but is not limited in this regard. Moreover, the e-paper display component 130 is disposed on the auxiliary display component 120, and is secured thereon using, for example, an adhesive (not shown), but is not limited in this regard.

In this embodiment, both of the auxiliary display component 120 and the e-paper display component 130 are configured to display an image. However, the color saturation and the brightness of the image displayed by the auxiliary display component 120 are greater than the color saturation and the brightness of the image displayed by the e-paper display component 130.

Thus, in order to allow a user 10 to selectively view the image displayed by the auxiliary display component 120 or the image displayed by the e-paper display component 130 according to actual requirements, in one embodiment of the present disclosure, the e-paper display component 130 selectively can be substantially transparent or be substantially opaque with displaying an image.

For example, in a normal mode, the e-paper display component 130 is substantially opaque. In this state, the image displayed by the e-paper display component 130 can be presented on a viewing plane (e.g., a plane that the user 10 views) of the display module 100, such that the user 10 can view the image displayed by the e-paper display component 130. It is noted that, in an opaque state as described above, the transparency of the e-paper display component 130 can be adjusted by a designer as needed. The e-paper display component 130 can be completely opaque or roughly opaque, so as to allow the user 10 to see the image displayed by the e-paper display component 130 but unable to see the image displayed by the auxiliary display component 120.

The normal mode, for example, can be activated under a condition of strong ambient light or under a condition where the display module 100 is displaying a text document. Under either of these conditions, since bright colors are not required, the user 10 can view the image of the display module 100 displayed by the e-paper display component 130.

On the other hand, in a shutter mode, the e-paper display component 130 does not display images and becomes substantially transparent, such that the image displayed by the auxiliary display component 120 is able to pass along the transparent e-paper display component 130 and be presented on the viewing plane of the display module 100. As a result, the user 10 can view the image displayed by the auxiliary display component 120 through the e-paper display component 130. It is noted that, in the transparent state as described above, the transparency of the e-paper display component 130 can be adjusted according to requirements by a designer. The e-paper display component 130 can be completely transparent or roughly transparent, so that the image displayed by the auxiliary display component 120 can pass through the e-paper display component 130.

In addition, the shutter mode, for example, can be activated under a condition of weak ambient light or under a condition where the display module 100 is displaying a movie, an animation, or other such images. Under either of these conditions, since high color saturation is required, the user 10 can view the image displayed by the auxiliary display component 120.

In one embodiment, in a normal mode, the auxiliary display component 120 can be in a standby state or a hibernation state, and does not display any image, so as to reduce the energy consumption of the display module 100.

In another embodiment, in a normal mode, the auxiliary display component 120 can display an image, so as to provide a backlight to the e-paper display component 130.

In one embodiment, the e-paper display component 130 is directly disposed on the auxiliary display component 120, instead of being disposed on another substrate. Hence, the size of the display module 100 can be reduced and the cost of manufacturing the display module 100 can also be reduced.

In one embodiment, the auxiliary display component 120 includes (or is formed from) a plurality of first pixels 122 arranged in a matrix, and the e-paper display component 130 includes (or is formed from) a plurality of second pixels 132 arranged in a matrix. In this embodiment, a size of the second pixels 132 of the e-paper display component 130 is smaller than a size of the first pixels 122 of the auxiliary display component 120, and the first pixels 122 and the second pixels 132 are staggered with respect to each other. Through such a configuration, the interference and the diffraction of the lights generated by the auxiliary display component 120 and the e-paper display component 130 can be avoided. However, it is noted that the relative sizes between the second pixels 132 and the first pixels 122 are not limited to the embodiment described above.

Figure 2:
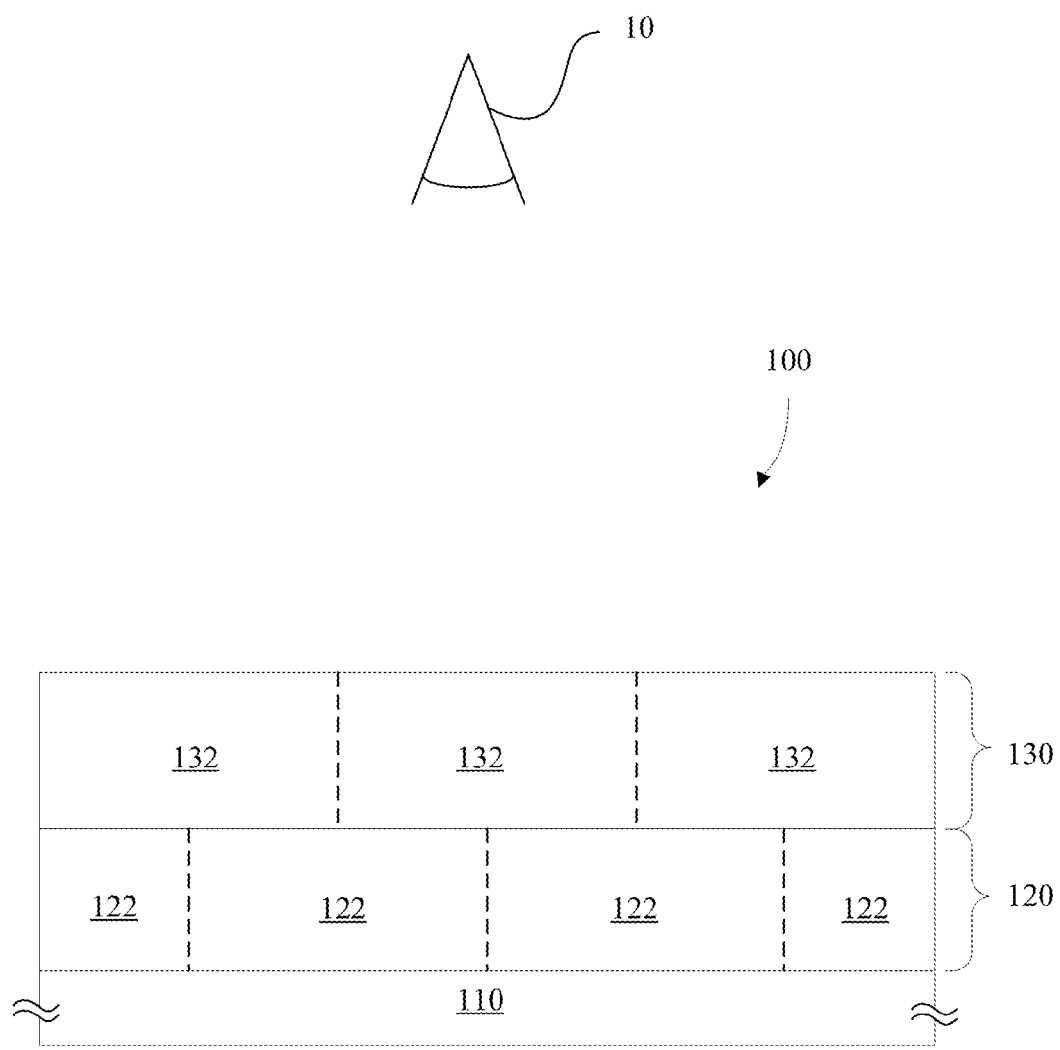
FIG. 2 is a schematic diagram of a display module according to one embodiment of the present invention.

Referring to FIG. 2, in one embodiment, the size of the second pixels 132 of the e-paper display component 130 is substantially equal to the size of the first pixels 122 of the auxiliary display component 120. However, the first pixels 122 and the second pixels 132 are staggered with respect to each other, such that the interference and the diffraction of the lights generated by the auxiliary display component 120 and the e-paper display component 130 can be avoided.

Details of the e-paper display component 130 will be described with reference to FIG. 3A and FIG. 3B in the paragraphs below. However, the present disclosure is not limited to the embodiment below.

Figure 3A:
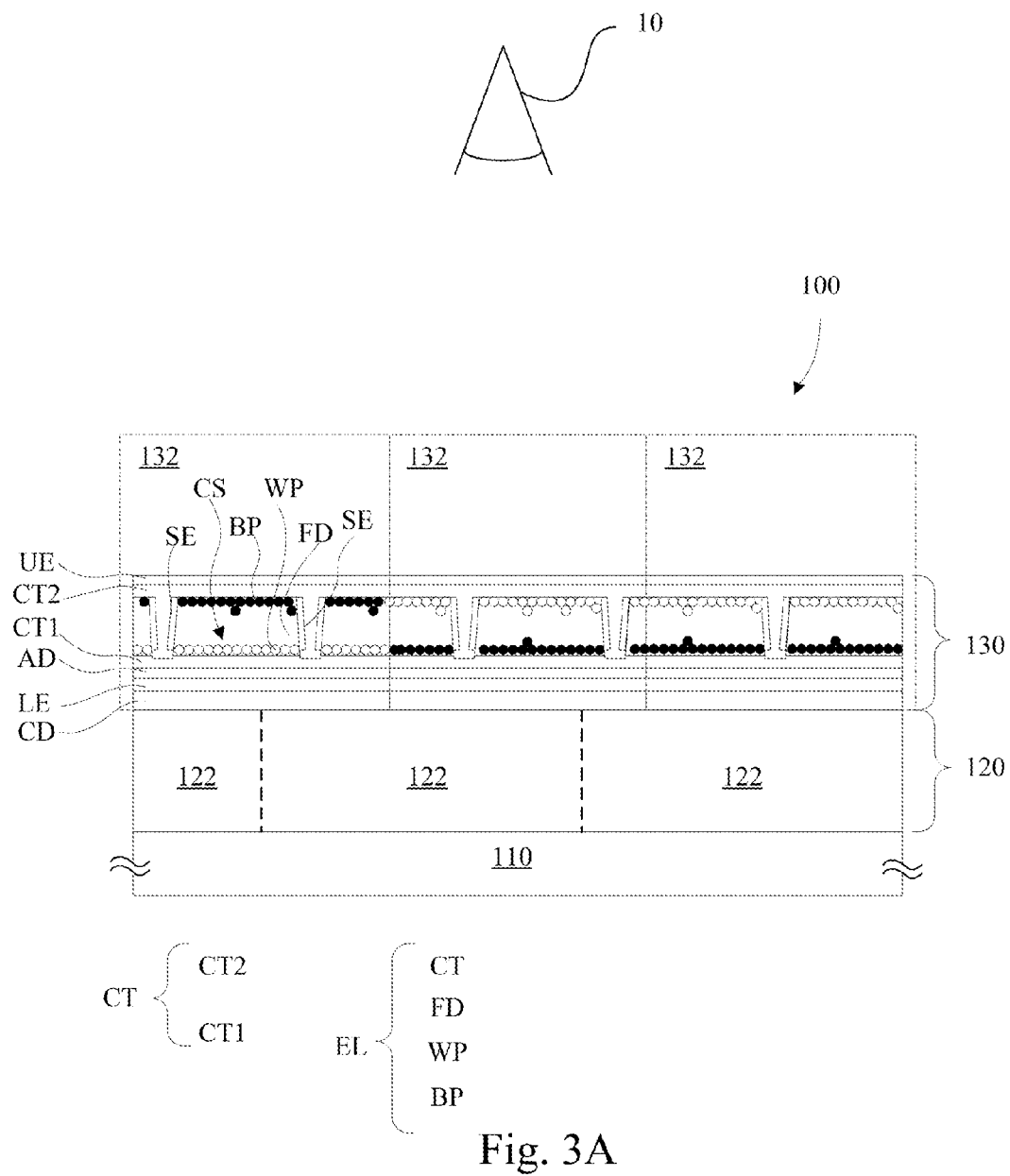
FIG. 3A is a sectional view of a display module according to one embodiment of the present invention.

In this embodiment, with reference to FIG. 3A, the e-paper display component 130 includes a patterned conductive layer CD, a lower electrode LE, an adhesion layer AD, an electronic ink layer EL, an upper electrode UE, and side electrodes SE. In this embodiment, the side electrodes SE, the upper electrode UE, the lower electrode LE, and the patterned conductive layer CD can be realized by using, for example, indium tin oxide (ITO), indium zinc oxide (IZO), or other transparent conductive materials.

In this embodiment, the patterned conductive layer CD includes transistors, data lines, and scan lines. The lower electrode LE is disposed on the patterned conductive layer CD and the lower electrode LE is electrically connected to the transistors, the data lines, and the scan lines of the patterned conductive layer CD. The adhesion layer AD is disposed on the lower electrode LE. The electronic ink layer EL is disposed between the upper electrode UE and the lower electrode LE, and is configured to be adhered on the lower electrode LE through an adhesive layer AD.

In this embodiment, the electronic ink layer EL includes a containing component CT (e.g., realized by using a translucent material such as polymethylate methacrylate (PMMA), polycarbonate (PC), and polyethylene terephthalate (PET)), a transparent dielectric fluid FD, white particles WP, and dark particles BP. The containing component CT includes a sealing portion CT1 and a containing portion CT2.

In this embodiment, the containing portion CT2 includes at least one micro-cup. The sealing portion CT1 can be disposed at the opening of the micro-cup of the containing portion CT2 to seal the micro-cup and form at least one containing space CS.

The transparent dielectric fluid FD, the white particles WP, and the dark particles BP are positioned in the containing space CS. The white particles WP and the dark particles BP have different types of electric charges. The e-paper display component 130 can attract the white particles WP or the dark particles BP to a viewing side of the e-paper display component 130 (e.g., a side adjacent to the upper electrode UE) to display an image through forming a vertical electrical field between the upper electrode UE and the lower electrode LE.

In this embodiment, the side electrodes SE are disposed on, for example, two sides of the containing space CS of the electronic ink layer EL (e.g., two sidewalls of the micro-cup of the containing portion CT2). The side electrodes SE disposed on two sides of the containing space CS are used to provide different voltages to form a horizontal electric field, and attract the white particles WP and the dark particles BP to two sides of the containing space CS corresponding to the side electrodes SE in the shutter mode, such that the e-paper display component 130 becomes substantially transparent.

It is noted that the two sides of the containing space CS where the side electrodes SE are disposed are different from the two sides of the containing space CS that the upper electrode UE and the lower electrode LE are adjacent to, and an electric field direction generated by the side electrodes SE disposed on the two sides of the containing space CS is different from a direction of a electric field generated by the upper electrode UE and the lower electrode LE. In one embodiment, the direction of the electric field generated by the side electrodes SE is substantially perpendicular to the direction of the electric field generated by the upper electrode UE and the lower electrode LE.

Through the configuration described above, in a normal mode, the upper electrode UE and the lower electrode LE attract the white particles WP and the dark particles BP separately, so as to enable the e-paper display component 130 to display an image. At this time, the e-paper display component 130 is substantially opaque and the side electrodes SE do not provide voltages, so as to avoid interfering with the image displayed by the e-paper display component 130. As a result, the user 10 can view the image displayed on the e-paper displayed component 130.

Figure 3B:
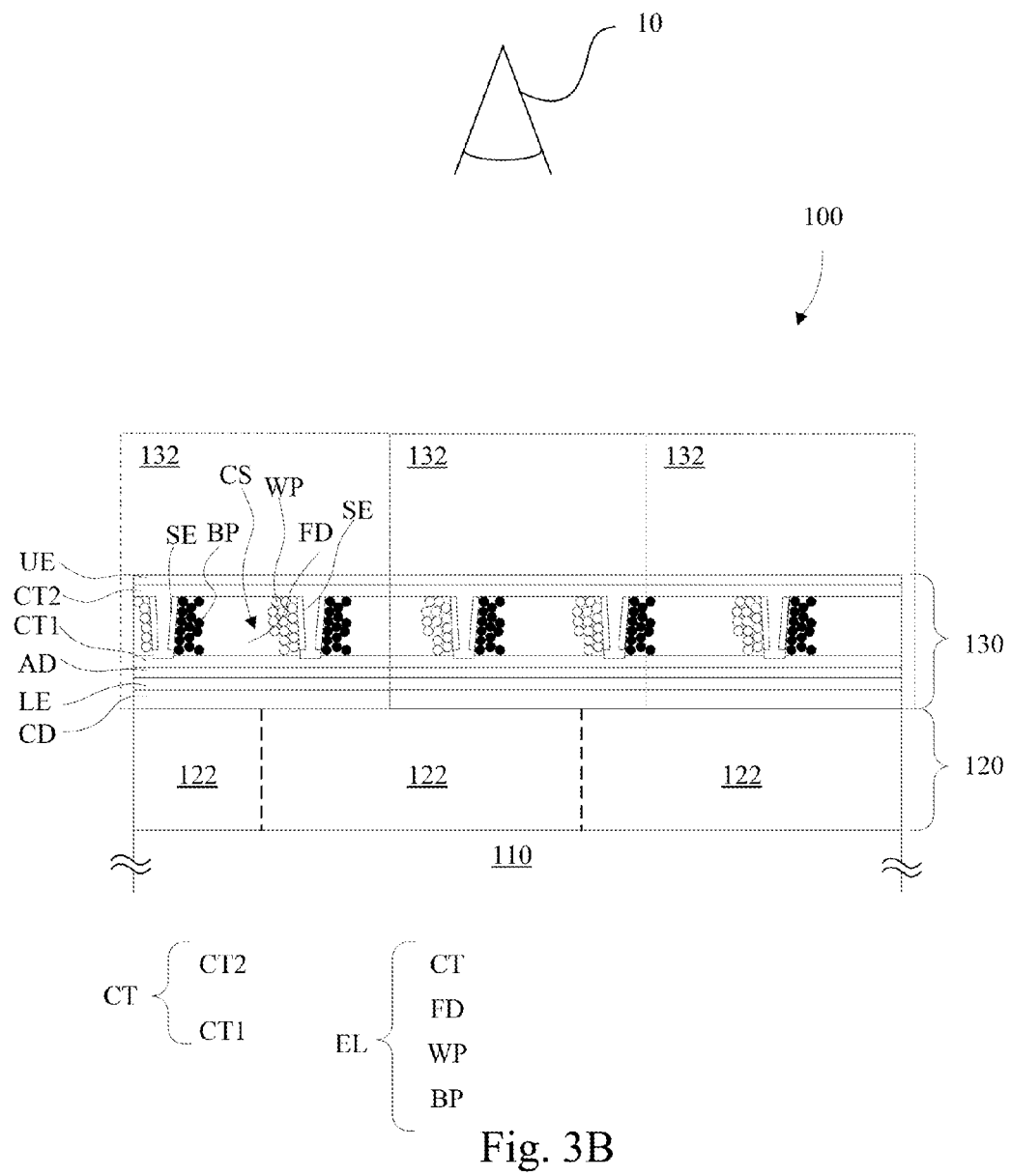
FIG. 3B illustrates the display module in FIG. 3A in a shutter mode.

In addition, in a shutter mode, with reference to FIG. 3B, the side electrodes SE are configured to separately provide different voltages and attract the white particles WP and the dark particles BP to two sides of the containing space CS corresponding to the side electrodes SE, so as to make the e-paper display component 130 be substantially transparent. At this time, the upper electrode UE and the lower electrode LE do not provide voltages, so as to avoid interfering with the transparent state of the e-paper display component 130. As a result, the user 10 can view the image displayed by the auxiliary display component 120 pass along the e-paper display component 130.

It is noted that an e-paper display component with a micro-cup design is taken as a descriptive example in FIG. 3A, FIG. 3B, and the embodiment described above. However, other types of e-paper display components, such as an e-paper display component with a microcapsule design, may also be used according to actual requirements. The types of the e-paper display component 130 in this invention are not limited to the embodiment described above.

Moreover, in the embodiment described above, both the e-paper display component 130 and the auxiliary display component 120 are formed on the same substrate 110 (that is, the e-paper display component 130 is disposed on the auxiliary display component 120, instead of being disposed on another substrate), but this invention is not limited to the embodiment described above. In another embodiment, the e-paper display component 130 and the auxiliary display component 120 can be manufactured separately first (that is, the e-paper display component 130 and the auxiliary display component 120 are separately formed on different substrates), and then the e-paper display component 130 and the auxiliary display component 120 are adhered together to form the display module 100.

Although the present invention has been described in considerable detail with reference to certain embodiments thereof, other embodiments are possible. Therefore, the scope of the appended claims should not be limited to the description of the embodiments contained herein.

What is claimed is:

1. A display module comprising:
   a substrate;
   an auxiliary display component disposed on the substrate; and
   an e-paper display component disposed on the auxiliary display component, wherein in a shutter mode, the e-paper display component is substantially transparent, such that an image displayed by the auxiliary display component is able to pass along the e-paper display component and be presented on a viewing side of the display module;
   wherein the auxiliary display component is formed from a plurality of first pixels, the e-paper display component is formed from a plurality of second pixels, and a size of at least one pixel of the first pixels is substantially equal to a size of at least one pixel of the second pixels,
   and wherein the first pixels and the second pixels are staggered with respect to each other.

2. The display module as claimed in claim 1, wherein in a normal mode, the e-paper display component is substantially opaque, and an image displayed by the e-paper display component is able to be presented on the viewing side of the display module.

3. The display module as claimed in claim 1, wherein the e-paper display component further comprises a plurality of white particles, a plurality of dark particles, and at least two side electrodes, and in a shutter mode, the at least two side electrodes separately attract the white particles and the dark particles, so as to make the e-paper display component be substantially transparent.

4. The display module as claimed in claim 1, wherein the auxiliary display component is formed from a plurality of first pixels, the e-paper display component is formed from a plurality of second pixels, and a size of at least one pixel of the second pixels is smaller than a size of at least one pixel of the first pixels.

5. The display module as claimed in claim 1, wherein the auxiliary display component is an active matrix organic light emitting diode display or a liquid crystal display.

6. A display module comprising:
   a substrate;
   an auxiliary display component disposed on the substrate; and
   an e-paper display component disposed on the auxiliary display component, the e-paper display component comprising:
      an upper electrode;
      a lower electrode;
      an electronic ink layer disposed between the upper electrode and the lower electrode, the electronic ink layer comprising:
         a containing space;
         a plurality of white particles positioned inside the containing space;
         a plurality of dark particles positioned inside the containing space; and
         at least two side electrodes separately disposed on at least two sidewalls of the containing space;
      wherein in a shutter mode, the at least two side electrodes separately attract the white particles and the dark particles, such that a user is able to see an image displayed by the auxiliary display component pass along the e-paper display component,
      wherein the auxiliary display component is formed from a plurality of first pixels, the e-paper display component is formed from a plurality of second pixels, and a size of at least one pixel of the first pixels is substantially equal to a size of at least one pixel of the second pixels,
      and wherein the first pixels and the second pixels are staggered with respect to each other.

7. The display module as claimed in claim 6, wherein in a normal mode, the e-paper display component separately attracts the white particles and the dark particles through the upper electrode and the lower electrode, such that the user is able to see an image displayed by the e-paper display component.

8. The display module as claimed in claim 6, wherein a direction of a first electric field generated by the upper electrode and the lower electrode is substantially perpendicular to a direction of a second electric field generated by the at least two side electrodes.

* * * * *